(12) United States Patent
Carlson

(10) Patent No.: US 6,976,629 B2
(45) Date of Patent: Dec. 20, 2005

(54) IMAGE CAPTURE SYSTEM AND METHOD

(75) Inventor: Bradley S. Carlson, Northport, NY (US)

(73) Assignee: Symbol Technologies, Inc., Holtsville, NY (US)

(*) Notice: Subject to any disclaimer, the term of this patent is extended or adjusted under 35 U.S.C. 154(b) by 110 days.

(21) Appl. No.: 10/385,967

(22) Filed: Mar. 11, 2003

(65) Prior Publication Data

US 2004/0032527 A1 Feb. 19, 2004

Related U.S. Application Data

(60) Provisional application No. 60/365,842, filed on Mar. 20, 2002.

(51) Int. Cl.$^7$ .................................................. G06K 7/10
(52) U.S. Cl. .............................. 235/462.11; 235/462.17; 235/462.24; 235/462.41
(58) Field of Search ....................... 235/462.01–462.49, 235/24, 454; 382/140, 321, 317; 250/200, 200.1, 206, 214 R, 214.1, 216, 208.1–208.6, 239

(56) References Cited

U.S. PATENT DOCUMENTS

| | | | | |
|---|---|---|---|---|
| 4,591,842 A | * | 5/1986 | Clarke et al. | 345/634 |
| 5,695,875 A | | 12/1997 | Merrill | |
| 5,714,745 A | * | 2/1998 | Ju et al. | 235/469 |
| 5,946,427 A | | 8/1999 | Kanemitsu | |
| 6,019,286 A | * | 2/2000 | Li et al. | 235/454 |
| 6,179,208 B1 | * | 1/2001 | Feng | 235/472.01 |
| 6,611,380 B2 | * | 8/2003 | Kowarz et al. | 359/618 |
| 2004/0031851 A1 | * | 2/2004 | Bianculli et al. | 235/462.41 |

FOREIGN PATENT DOCUMENTS

JP 61187282 8/1986

* cited by examiner

Primary Examiner—Diane I. Lee
Assistant Examiner—Kimberly D. Nguyen
(74) Attorney, Agent, or Firm—Kirschstein, et al.

(57) ABSTRACT

A full color image of a target and/or a monochrome image of an optical code are captured by an imaging array in which each sensor measures red, green and blue signals. Optical codes are electro-optically read with higher resolution, sensitivity and signal-to-noise ratio, thereby improving performance of optical code readers.

18 Claims, 5 Drawing Sheets

IMAGE CAPTURE SYSTEM AND METHOD

CROSS REFERENCE TO RELATED APPLICATION

This application claims the priority of U.S. Provisional Patent Application Ser. No. 60/365,842, filed Mar. 20, 2002.

BACKGROUND OF THE INVENTION

1. Field of the Invention

The present invention generally relates to image capture systems and methods and, more particularly, to capturing a full color image of a target and/or capturing a monochrome image of an optical code symbol to be read, especially by using an imaging array of pixel sensors each operative for measuring each of three primary colors of incident light at the same location of a respective sensor.

2. Description of the Related Art

Optical codes are patterns made up of image areas having different light-reflective or light-emissive properties, which are typically assembled in accordance with a priori rules. The term "barcode" is sometimes used to describe certain kinds of optical codes. The optical properties and patterns of optical codes are selected to distinguish them in appearance from the background environments in which they are used. Devices for identifying or extracting data from optical codes are sometimes referred to as "optical code readers" of which barcode scanners are one type. Optical code readers are used in both fixed or portable installations in many diverse environments such as in stores for check-out services, in manufacturing locations for work flow and inventory control, and in transport vehicles for tracking package handling. The optical code can be used as a rapid, generalized means of data entry, for example, by reading a target barcode from a printed listing of many barcodes. In some uses, the optical code reader is connected to a portable data processing device or a data collection and transmission device. Frequently, the optical code reader includes a hand-held sensor which is manually directed at a target code.

Most conventional optical scanning systems are designed to read one-dimensional barcode symbols. The barcode is a pattern of variable-width rectangular bars separated by fixed or variable width spaces. The bars and spaces have different light-reflecting characteristics. One example of a one-dimensional barcode is the UPC/EAN code used to identify, for example, product inventory. An example of a two-dimensional or stacked barcode is the PDF417 barcode. A description of PDF417 barcode and techniques for decoding it are disclosed in U.S. Pat. No. 5,635,697. Another conventional optical code is known as "MaxiCode". It consists of a central finder pattern or bull's eye center and a grid of hexagons surrounding the central finder. It should be noted that the aspects of the inventions disclosed in this patent application are applicable to optical code readers, in general, without regard to the particular type of optical codes which they are adapted to read. The invention described is also applicable to some associated image recognition or analysis.

Most conventional scanning systems generate one or more beams of laser light which reflects off a barcode symbol and back to the system. The system obtains a continuous analog waveform corresponding to the light reflected by the code along one or more scan lines of the system. The system then decodes the waveform to extract information from the barcode. A system of this general type is disclosed, for example, in U.S. Pat. No. 4,251,798. A beam scanning system for detecting and decoding one-and two-dimensional barcodes is disclosed in U.S. Pat. No. 5,561,283.

Many scanners in use today employ a scanning laser beam. Some such systems are deployed in hand-held units which may be manually pointed at a target. Often an individual scanner is a component of a much larger system including other scanners, computers, cabling, data terminals, etc.

Barcodes can also be read by employing imaging devices. For example, an image sensor may be employed which has a two-dimensional array of cells or pixel sensors which correspond to image elements or pixels in a field of view of the device. Such an image sensor may be a two-dimensional or area charge coupled device (CCD) and associated circuits for producing electronic signals corresponding to a two-dimensional array of pixel information for a field of view.

It is therefore known to use a CCD for capturing a monochrome image of a barcode symbol to be read as, for example, disclosed in U.S. Pat. No. 5,703,349. It is also known to use a CCD with multiple buried channels for capturing a full color image of a target as, for example, disclosed in U.S. Pat. No. 4,613,895.

Due to the difficulties and expense of making such CCDs, it is known from U.S. Pat. No. 3,971,065 to use a color filter mosaic to select different wavelength bands at different pixel sensor locations. One popular mosaic used in digital cameras is the Bayer color filter array (CFA) pattern having 50% green pixels arranged in a checkerboard and alternating lines of 25% red and 25% blue pixels filling the remainder of the pattern.

Although generally satisfactory for its intended purpose, the Bayer CFA has color aliasing, resolution and sensitivity problems due in part to the fact that the sensors for the different colors are at different locations. To alleviate such problems, the prior art has proposed in U.S. Pat. No. 5,965,875 an imaging array for measuring the different colors at the same location, that is, at each sensor, by using a triple-well, integrated circuit structure. The art of CCD-based barcode readers, however, still suffers from poor resolution and sensitivity problems when capturing the monochrome image of an optical code with a CFA detector.

SUMMARY OF THE INVENTION

Objects of the Invention

Accordingly, it is a general object of this invention to improve the resolution and sensitivity of electro-optically reading optical codes which employ imaging devices.

More particularly, it is an object of the present invention to enable a single device to capture a full color image of a target and/or a monochromatic image of an optical code.

Still another object of the present invention is to process both full color and monochrome images from a single imaging array.

Features of the Invention

In keeping with the above objects and others which will become apparent hereinafter, one feature of the present invention resides, briefly stated, in an image capture system and method which employ an imaging array of pixel sensors spaced apart at respective locations in the array for detecting light incident on the sensors. Each pixel sensor has three photosensors and is operative for measuring each of three primary colors of the incident light at the same location of the respective sensor to obtain a measured red signal, a measured blue signal and a measured green signal, preferably, as disclosed in U.S. Pat. No. 5,965,875, by detecting differences in absorption length in silicon of different wavelengths of the incident light at each sensor. This full color imaging array which senses every primary color in every sensor is operative for capturing a high resolution, high sensitivity, three-color image of a target in a target imaging mode of operation as compared to the known Bayer CFA.

In accordance with this invention, this imaging array is modified to capture a monochrome image of an optical code in a reading mode of operation. For reading an optical code, it is not necessary to distinguish among colors in the image. Hence, this invention proposes the mixing and combining of a plurality of the measured signals, for example, the red and the blue signals, to produce a composite signal which is used to read the optical code. This mixing can be performed by hardware or software outside the array, or within the array, in both the analog or digital domain. The composite signal has a higher resolution and a higher sensitivity as compared to known CFA imaging arrays such as CCDs used in optical code readers, because the composite signal is generated from three measured signals at each pixel sensor, and not from one measured signal at each pixel sensor.

In a preferred embodiment, the system is mounted in an imaging engine or module which, in turn, is mounted in a device such as a portable or fixed mount reader, or other form factor. In the case of a hand-held or finger-mounted reader, it is especially desirable if a manually operated trigger is used by an operator to switch as desired between the target imaging and reading modes.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
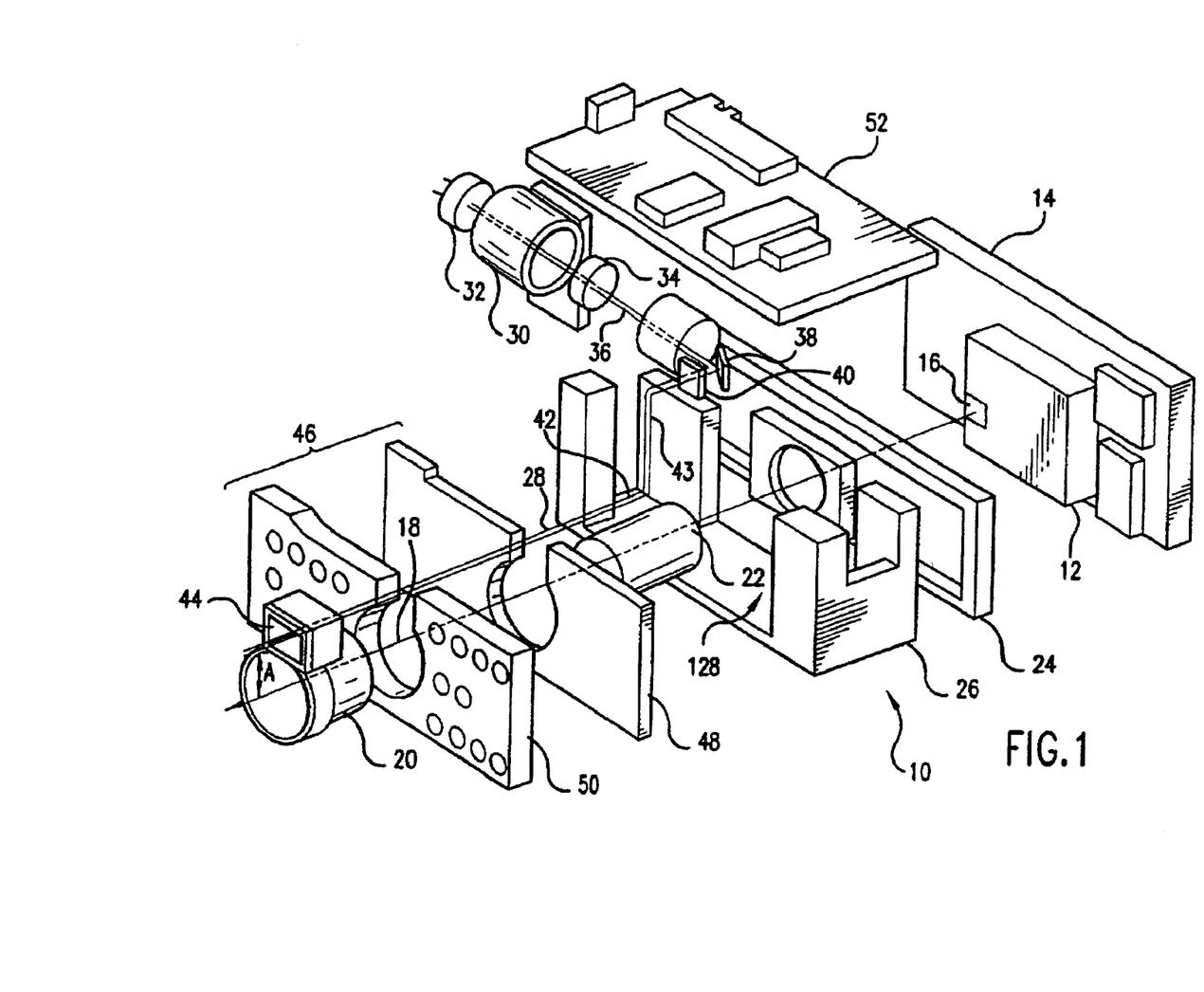
FIG. 1 is an exploded view of a miniature imaging engine of a preferred embodiment of this invention.

Referring now to the drawings, FIG. 1 illustrates an optical code imaging engine 10 of a preferred embodiment of the present invention. The figure is an exploded view illustrating certain optical paths and subsystems of the imaging engine. As shown, the imaging engine includes various circuit boards, optical elements and chassis elements. A packaged image sensor array 12 is located on an image sensor board 14. The image sensor board 14 may also contain image acquisition circuitry associated with the image sensor array 12. In a preferred embodiment, the imaging array 12 has a window 16 through which an incident image is received. The array converts the incident light into electrical signals which are processed as described below. A suitable array is disclosed in U.S. Pat. No. 5,965,875, the contents of which are incorporated herein by reference thereto.

A line 18 indicates the principal optical axis of the image sensor array 12 of the imaging engine 10. The principal optical axis 18 passes through an optical baffle 20 into an objective lens assembly 22 having the same principal optical axis as the system as a whole. The optical axis 18 then passes to the window 16 of the array 12.

In operation, a field of view of the imaging engine is imaged by the image sensor array 12. More particularly, light from the field of view passes through the optical baffle 20 and into the lens assembly 22 which focuses the light on the surface of the array. An array of cells or pixel sensors each having three photosensors produce electronic signals corresponding to a two-dimensional array of pixel information for a target image. Each pixel sensor is operative for measuring each of three primary colors of the incident light at the same location in the array as the respective sensor to obtain a measured red signal, a measured blue signal and a measured green signal for each sensor, as described below in more detail.

The image sensor board 14 carrying the array 12 and the lens assembly 22 is mounted on chassis member 24. A second chassis member 26, together with the first chassis member, forms a rigid body for the imaging engine.

The imaging engine 10 is provided with an aiming system which will be described in connection with an optical path 28. Light for the aiming system is provided by an aiming beam generator assembly 30 which includes a laser diode 32 and a torroidal lens 34. An aiming laser beam 36 emanates from the generator assembly and is reflected by a folding mirror 38 through a diffractive optical element 40. The diffractive element 40 creates diverging beamlets which follow a path indicated by the numeral 42 (the path 42 has been stretched in the y-axis direction as indicated by the broken lines 43 in order to facilitate the rendering of an exploded view in FIG. 1). The diverging beamlets from the aiming system exit the imaging engine through a front face of the imaging engine at a window 44 in the optical baffle element 20. The location of the diffractive element 40 near the front face of the imaging engine permits a reduction in size of the engine, because space does not have to be provided within the engine for beamlet divergence. Dimension A indicates an offset between the principal optical axis 18 of the lens assembly 22 and the beamlet path 28 which is the principal optical axis of the aiming system at the point where the aiming beamlets exit the imaging engine. The dimension A in preferred embodiments is less than ½", for example 5 mm.

An illumination source 46 for the imaging engine 10 is provided in preferred embodiments of the present invention. An illumination printed circuit board 48 carries light emitting diodes. A lenslet plate 50 forms the external front face of the imaging engine. Light from laser diodes on the illumination printed circuit board 48 passes through the lenslet plate 50 and provides an illumination field for the imaging engine. Power for the illumination printed circuit board is provided from the power supply board 52. Power for the other electronic components of the imaging engine including the image sensor board may also be provided by the power supply board 52.

The imaging engine, when assembled, forms an extremely compact unit, typically measuring 1"×1.5"×0.75" in size and about 1.25 cubic inches in volume. The compact unit can conveniently fit within optical readers of various form factors, such as hand-held reader 54 of FIG. 2 which includes a housing 56 having a generally elongated handle or hand grip 58 and an upper portion 60 for housing the imaging engine 10. The front face of the imaging engine appears at the forward end of the upper portion of the hand-held optical code reader 54. The cross sectional dimensions and overall size of the handle portion 58 are such that the optical code reader can conveniently be held in the user's hand. The body and the handle portions may be constructed of a lightweight resilient shock-resistant self-supporting material such as a synthetic plastic material. The plastic housing may be injection molded but can be vacuum formed or blow-molded to form a thin hollow shell which bounds an interior space whose volume is sufficient to contain the imaging engine 10 and other components.

Figure 2:
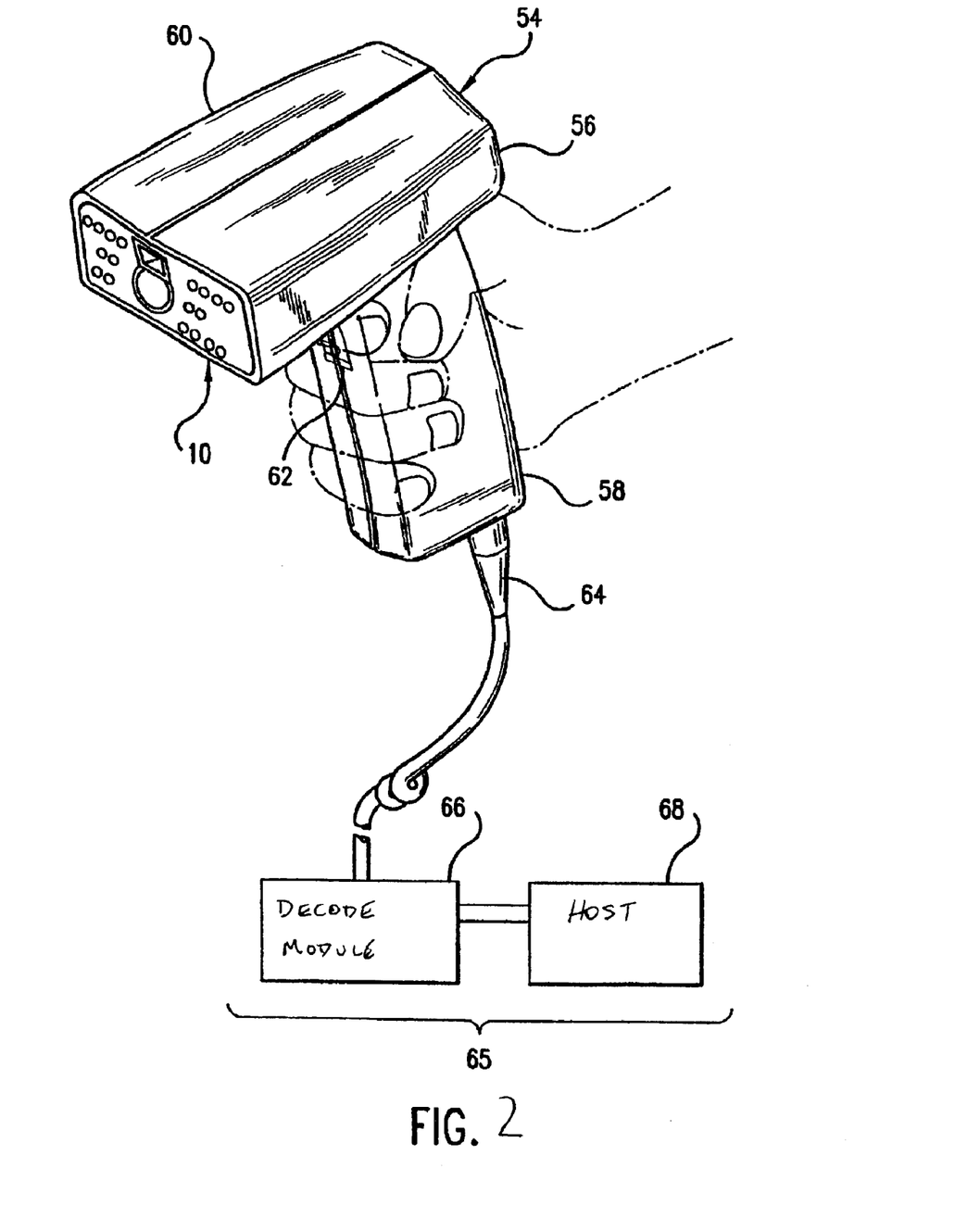
FIG. 2 is a perspective view of a hand-held optical code reader incorporating the imaging engine of FIG. 1.

A manually actuatable trigger 62 is mounted in moving relationship on the handle portion 58 in a forward facing region of the optical code reader. The user's forefinger is normally used to actuate the optical code reader by depressing the trigger. A flexible electrical cable 64 may be provided to connect the optical code reader to components of the code reading system. In alternative embodiments, the cable may also provide electrical power to the imaging engine 10. In preferred embodiments, the cable 64 is connected to a host device or system 65 which receives decoded data from the optical code reader. In alternative embodiments, a decode module 66 may be provided exterior to the optical code reading engine 10. In such an embodiment, decoded data from the decode module 66 may be transmitted to further host device processing equipment and terminals represented generally by the box at numeral 68.

Figures 3, 4:
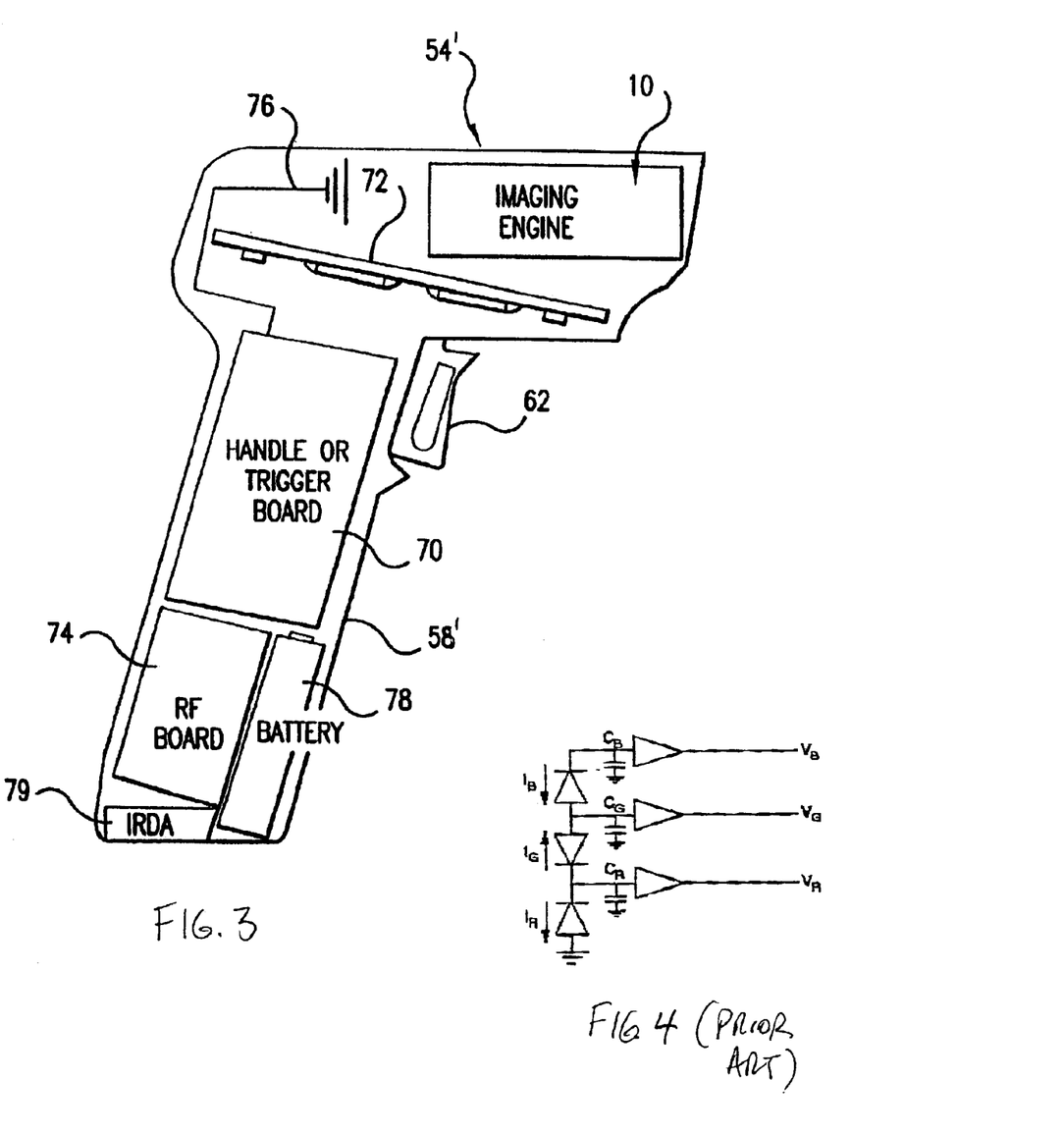
FIG. 3 is a sectional view of another hand-held optical code reader incorporating the imaging engine of FIG. 1.
FIG. 4 is an electrical circuit equivalent of a known pixel sensor of a full color imaging array in accordance with the prior art.

FIG. 3 is a sectional view of another preferred embodiment of a hand-held optical code reader 54' in accordance with preferred embodiments of the present invention showing the location of the imaging engine 10. This embodiment is battery powered and wireless. A decoding board 72 (including the microprocessor) may be provided external to the imaging engine 10.

A trigger or handle circuit board 70 is located in the handle portion 58' of the hand-held optical code reader. The trigger board is electrically connected to switch means associated with the trigger 62 of the hand-held device and processes signals indicative of the operator's depressing of the trigger 62 in order to initiate, or continue, reading of optical codes.

In addition to circuitry associated with the trigger, the handle of the optical code reader of FIG. 3 may contain a radio frequency board 74 and antenna 76 which provide a mobile radio link to one or more data terminals. Electrical power for the optical code reader 54' may be provided by battery 78. An infrared data interface (IRDA) 79 or multi-contact shoe (not shown) may also be provided to communicate data between the optical code reader and an external receiver or docking device, respectively.

Imaging engine electronic hardware includes two major electrical subsystems: an imaging subsystem and a decoding subsystem. The imaging subsystem includes an imaging array, analog-to-digital converter, timing generator, automatic gain control (AGC) circuit and the peripheral circuits to control the above components. The decoding subsystem is constructed around a microprocessor unit. In preferred embodiments the microprocessor is an IBM manufactured PoweredPC (403 Series). The PowerPC is a 32 bit RISC embedded controller which provides high performance and functional integration with low power consumption. Other components of the decoding subsystem include a flash ROM, DRAM, I/O (8 bit bidirectional parallel port, 16 user/system single bit I/O's) and required glue logic.

Turning now to FIG. 4, an electrical circuit equivalent is illustrated of the basic structure of each pixel sensor of the array 12. Each sensor measures a blue voltage signal $V_B$, a green voltage signal $V_G$ and a red voltage signal $V_R$. The corresponding photocurrents are $I_B$, $I_G$ and $I_R$. The corresponding capacitances are $C_B$, $C_G$ and $C_R$. The three measured voltage signals of each sensor are processed to produce a full, three-color image of a target during a target imaging mode of operation, as is conventional, for example, in the operation of a digital camera in taking a color picture of an object, person, scene, or like target. The full color image has a high resolution and sensitivity due in part to the fact that each sensor measures three different colors, as opposed to measuring only one color at each sensor as is the case for the Bayer CFA.

To provide this same high resolution and high sensitivity during a reading mode of operation in which optical codes are imaged, this invention proposes the combining or mixing of a plurality of the measured color signals to produce a composite, monochrome, or gray-scale signal $V_M$. More particularly, an analysis of the circuit of FIG. 4 leads to the following relationships between output voltages and photocurrents:

$$\Delta V_B = -I_B C_B \Delta t$$

$$\Delta V_G = (I_B + I_G) C_G \Delta t$$

$$\Delta V_R = -(I_R + I_G) C_R \Delta t$$

Algebraic manipulation of the above expressions leads to the following expression:

$$V_M = \Delta V_B + \Delta V_R = -(I_G + I_B + I_R) \Delta t C_B C_R / (C_B + C_R)$$

Thus, summing the voltage signals from the red and blue photodiodes of each sensor yields a quantity proportional to the three photocurrents. This quantity is suitable for measuring the monochrome signal for a gray scale image of an optical code. This monochrome signal comprised of a composite of the measured color signals is generated at each sensor and, thus, the resulting processed gray-scale image has a higher resolution, a higher sensitivity and a higher signal-to-noise ratio as compared to prior art CFA CCD-based sensor arrays in which only one color signal is measured at each sensor.

Figure 5:
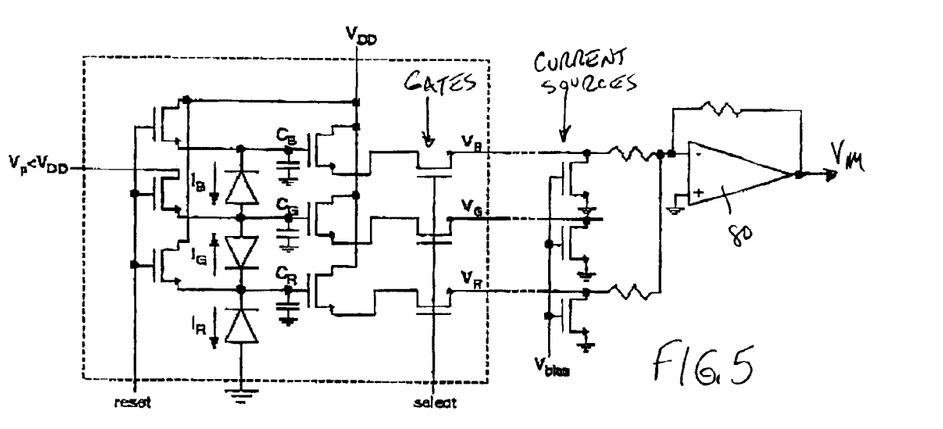
FIG. 5 is an electrical circuit depicting one embodiment of an image capture system in accordance with this invention.

FIG. 5 depicts a voltage summation amplifier 80 that sums the measured, blue and red, analog voltage signals from each sensor to produce the monochrome signal $V_M$. FIG. 5 shows the sensor circuit of FIG. 4 together with the standard reset and select line circuits, as well as the standard bias circuits to the current sources for each color.

Figure 6:
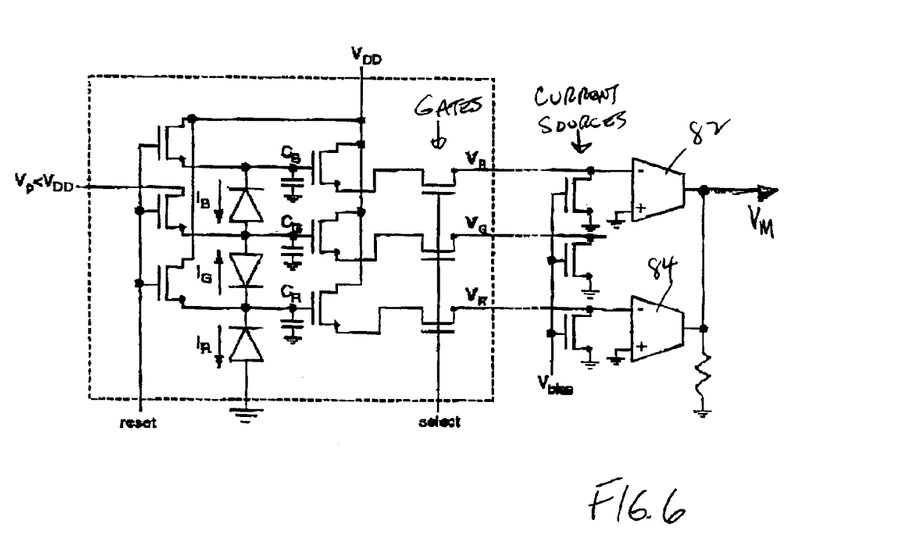
FIG. 6 is an electrical circuit depicting another embodiment of an image capture system in accordance with this invention.

FIG. 6 is analogous to FIG. 5, but a pair of transconductance amplifiers 82, 84 is used to convert the measured, blue and red, analog voltage signals to corresponding current signals, and then to sum the current signals. The output voltage $V_M$ is proportional to the gray-scale intensity.

Figure 7:
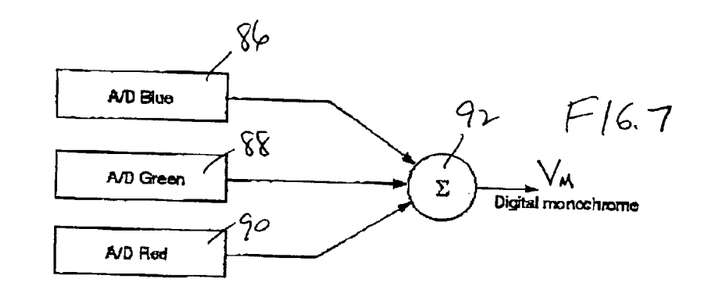
FIG. 7 is an electrical circuit depicting still another embodiment of an image capture system in accordance with this invention.

FIG. 7 is a schematic diagram showing analog-to-digital converters 86, 88, 90 for respectively converting the measured, analog, blue, green and red signals to digital form, and then digitally combining them in a summing circuit 92. The digital composite signal $V_M$ is a weighted sum of the three colors. The weighting factors for each color are the same or different. FIG. 7 is especially useful when integrated on the same integrated circuit chip as the imaging array.

Figure 8:
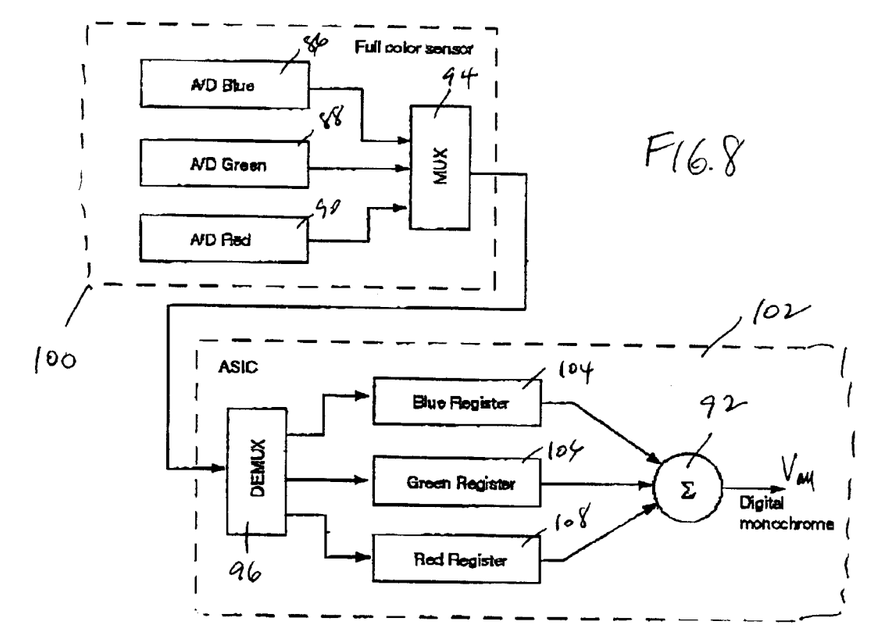
FIG. 8 is an electrical circuit depicting yet another embodiment of an image capture system in accordance with this invention.

FIG. 8 is a circuit that also produces a digital composite signal, but employing a separate ASIC chip. As before, the converters 86, 88, 90 on the same chip 100 as the imaging array produce respective digital, blue, green and red signals. These signals are fed to a multiplexer (MUX) 94 which is, in turn, connected to a demultiplexer (DEMUX) 96 on a different ASIC chip 102. The outputs of the DEMUX are fed to respective blue, green and red registers 104, 106, 108 whose outputs are, in turn, fed to a summing circuit 92 which produces the digital monochrome signal.

In all embodiments, the generation of the composite signal from the individual color signals does not destroy the integrity of the color signals. The individual color signals can be used to process the full color image in the target imaging mode, and the composite signal can be separately produced and used to process the gray-scale or black-and-white image in the reading mode. The selection of the modes can be manually performed by, for example, depressing the trigger 62 once or twice, or pressing and holding the trigger longer than a predetermined time, or employing a two-position trigger, or employing two distinct triggers. Mode selection can also be performed automatically by programming a register or producing an electrical trigger signal upon the occurrence of a predefined event. In another embodiment, the composite signal can be generated from only one of the measured signals, for example, the red signal.

Still another application of the use of the above-described imaging array is in the field of direct part mark readers. It is known to use glancing illumination from several directions to obtain image contrast. Performance can be enhanced by enabling the simultaneous capture of three independent images.

Thus, the use of a full color image array enables the acquisition of three images by using three separate colors (red, green and blue). Three banks of light emitting diodes (LEDs) are switched on to illuminate an optical code from three different directions. Since the array separates the colors, the images from the three banks of LEDs are acquired simultaneously, thereby decreasing the known image acquisition time, typically 30 ms, by a factor of ⅔.

It will be understood that each of the elements described above, or two or more together, also may find a useful application in other types of constructions differing from the types described above.

While the invention has been illustrated and described as embodied in an image capture system and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An image capture system, comprising:
   a) an imaging array of pixel sensors spaced apart at respective locations in the array for detecting light incident on the sensors, each pixel sensor being operative for measuring each of three primary colors of the incident light at the same location as the respective sensor to obtain a measured red signal, a measured blue signal and a measured green signal;
   b) means for combining a plurality of the measured signals to produce a composite signal from each pixel sensor; and
   c) means for selecting between a target imaging mode of system operation in which a full color image of a target is captured by the array by processing the measured signals from a plurality of the pixel sensors, and an optical code reading mode of system operation in which a monochrome image of an optical code is captured by the array by processing the composite signal from a plurality of the pixel sensors.

2. The image capture system of claim 1, wherein the combining means is operative for combining the measured red and blue signals to yield the composite signal.

3. The image capture system of claim 1, wherein the combining means includes a voltage summation amplifier.

4. The image capture system of claim 1, wherein the combining means includes a transconductance amplifier.

5. The image capture system of claim 1, wherein the measured signals are analog signals, and wherein the combining means is operative for producing the composite signal as an analog signal.

6. The image capture system of claim 1, wherein the measured signals are analog signals, and wherein the combining means includes a converter for converting the analog signals into respective digital signals, and wherein the combining means is operative for producing the composite signal as a digital signal.

7. The image capture system of claim 1, wherein the means for selecting between modes includes an actuator.

8. The image capture system of claim 7, wherein the actuator includes a manually-operated switch switchable between positions corresponding to the respective modes.

9. The image capture system of claim 1, wherein each sensor is operative for detecting differences in absorption length in silicon of different wavelengths of the incident light.

10. The image capture system of claim 1; and a support for supporting the array, the means for combining, and the means for selecting.

11. An image capture method, comprising the steps of:
    a) detecting light incident on an imaging array of pixel sensors spaced apart at respective locations in the array, each pixel sensor being operative for measuring each of three primary colors of the incident light at the same location as the respective sensor to obtain a measured red signal, a measured blue signal and a measured green signal;
    b) combining a plurality of the measured signals to produce a composite signal from each pixel sensor; and
    c) selecting between a target imaging mode of operation in which a full color image of a target is captured by the array by processing the measured signals from a plurality of the pixel sensors, and an optical code reading mode of operation in which a monochrome image of an optical code is captured by the array by processing the composite signal from a plurality of the pixel sensors.

12. The image capture method of claim 11, wherein the combining step is performed by combining the measured red and blue signals to yield the composite signal.

13. The image capture method of claim 11, wherein the measured signals are analog signals, and wherein the combining step is performed by producing the composite signal as an analog signal.

14. The image capture method of claim 11, wherein the measured signals are analog signals, and wherein the combining step includes the step of converting the analog signals into respective digital signals, and wherein the combining step is performed by producing the composite signal as a digital signal.

15. The image capture method of claim 11, wherein the selecting step is manually performed.

16. The image capture method of claim 11, wherein the detecting step is performed by detecting differences in absorption length in silicon of different wavelengths of the incident light on each sensor.

17. An image capture system, comprising:
    a) an imaging array of pixel sensors spaced apart at respective locations in the array for detecting light incident on the sensors, each pixel sensor being operative for measuring each of three primary colors of the incident light at the same location as the respective sensor to obtain a measured red signal, a measured blue signal and a measured green signal;

b) means for using at least one of the measured signals to produce a composite signal from each pixel sensor; and c) means for selecting between a target imaging mode of system operation in which a full color image of a target is captured by the array by processing the measured signals from a plurality of the pixel sensors, and an optical code reading mode of system operation in which a monochrome image of an optical code is captured by the array by processing the composite signal from a plurality of the pixel sensors.

18. The image capture system of claim 17, wherein the using means is operative for combining a plurality of the measured signals to produce the composite signal.

* * * * *